United States Patent Office 3,229,793
Patented Jan. 18, 1966

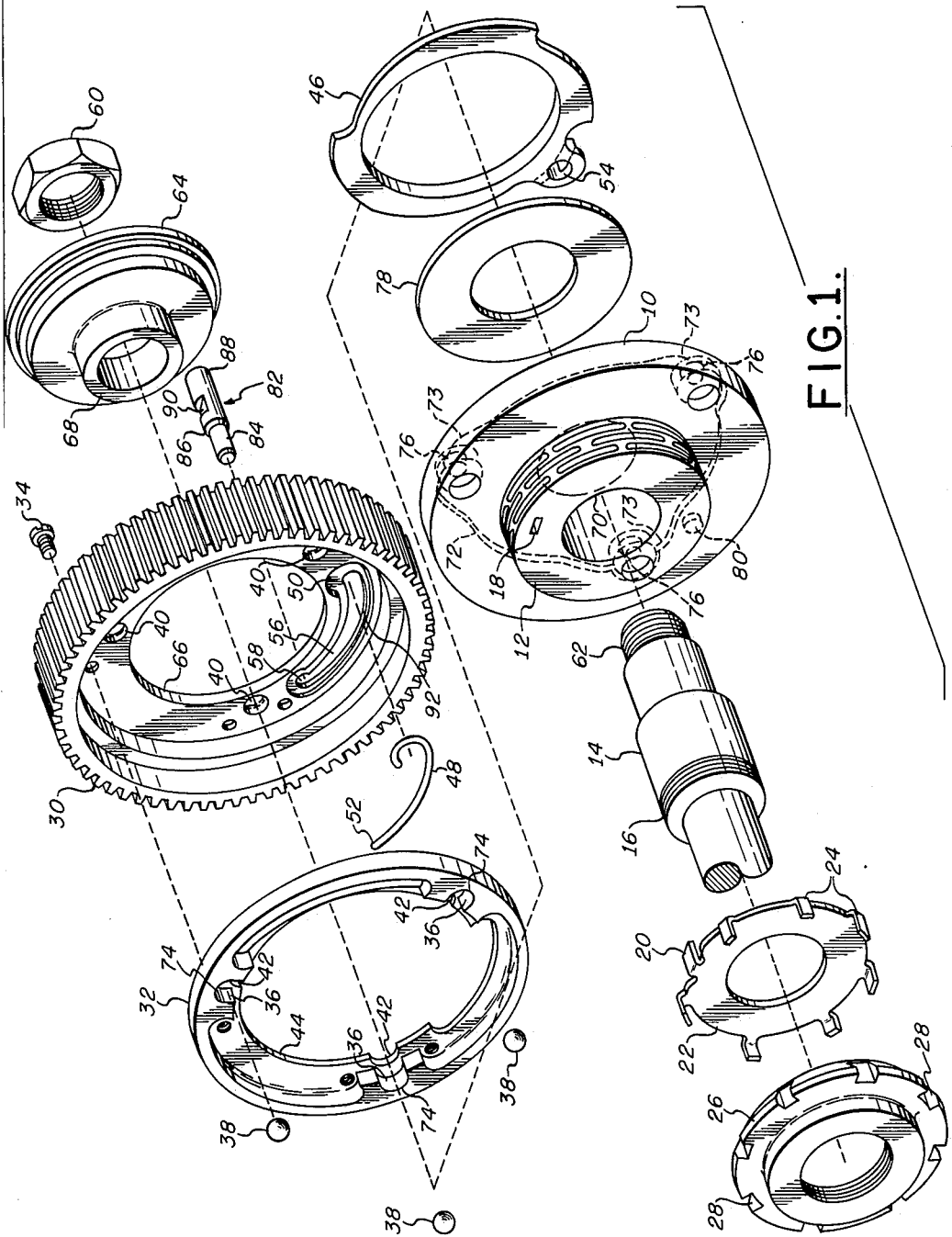

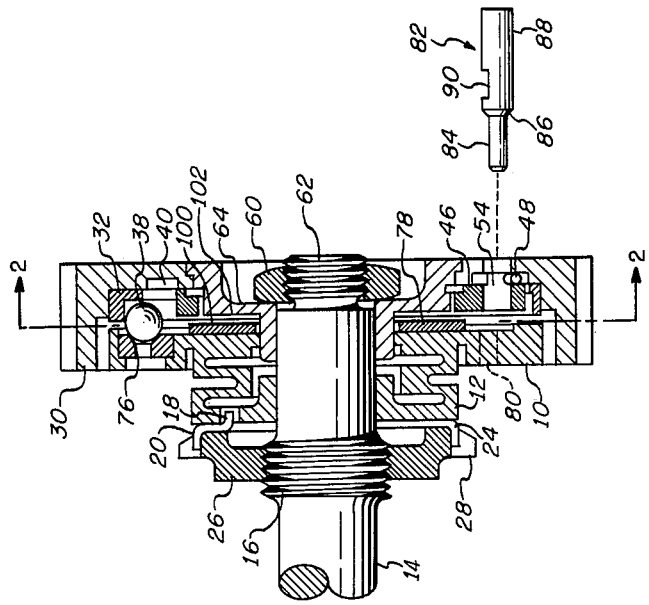
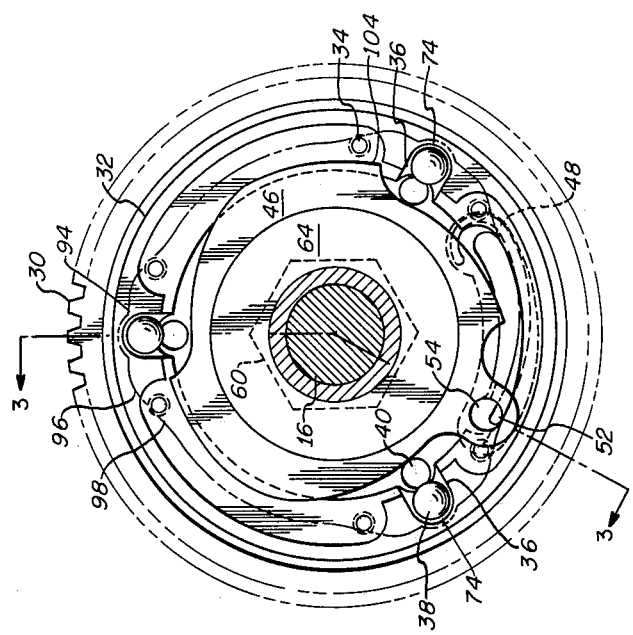

3,229,793
CLUTCH RESPONSIVE TO PREDETERMINED FORCE
Peter E. Jacobson, Phoenix, Ariz., assignor to Sperry Rand Corporation, Great Neck, N.Y., a corporation of Delaware
Filed Aug. 22, 1962, Ser. No. 218,721
5 Claims. (Cl. 192—56)

This invention relates in general to clutch apparatus and in particular to a manually resettable clutch which disengages when relative motion between input and output clutch members exceeds a predetermined amount, such motion being in either of two counterdirections.

In aircraft control apparatus hard-over signals resulting from system failures are sometimes applied which tend to drive craft control surfaces in particular directions, thereby requiring that the pilot apply a continual control stick bias force just to prevent the craft from changing course. Then, when the pilot desires a course change the control stick force must be increased or decreased about such bias.

To prevent pilot fatigue resulting from the continual force that he must apply under such conditions, it is desirable to disable the autopilot; further, such disabling is desirably kept until the craft reaches the ground, this being to prevent the pilot himself from deliberately re-engaging the autopilot and thereby possibly preventing ground crews from checking for malfunctions (which may even be intermittent).

By means of the present invention a clutch is provided which abruptly disengages the autopilot from a craft control surface when a predetemined control stick force (in either of two counterdirections) is applied to overpower the autopilot. Then, by means of a special key usually located at a ground repair station, the autopilot can be re-engaged for repair purposes. In providing these features, use is made of ball carrying channels in a clutch part sandwiched between the input clutch member (driven by the control stick) and the output clutch member (that drives the control surface), such output clutch member being secured to the part provided with the channels and being provided with receptacles radially aligned with the channels. So long as the balls are in their respective channels, they contact the input and output clutch members and transmit rotary motion therebetween. A cam secured to the input clutch member however is provided which urges the balls along the channels and into the receptacles when the clutch slips, i.e. when there is relative motion between the input and output clutch members. Once in the receptacles, the balls cease to contact the input and output clutch members, the result being that the clutch is disengaged. To re-engage the clutch, a key-operated reset cam is provided which urges the balls out of their receptacles and back into the channels.

A principal object of the present invention is to provide a clutch which disengages when a torque in excess of a predetermined amount is applied between input and output clutch members.

Another object of the invention is to provide a clutch which disengages when the relative motion between input and output clutch members exceeds a predetermined amount.

Another object of the invention is to provide clutch apparatus which disengages when applied torques, in either of two counterdirections, exceed predetermined amounts.

Another object of the invention is to provide clutch apparatus which may be re-engaged only by use of a reset key.

Another object is to provide a clutch which disengages abruptly when relative motion between input and output members exceeds a certain amount, such disengagement being unaccompanied by a change in the coupling between the input and output members.

Another object is to provide a clutch which disengages abruptly when a certain relative motion exists between input and output members, such disenagement being preceded by a gradual increase in the coupling between input and output members.

The invention will be described with reference to the figures wherein:

FIG. 1 is an exploded view of a presently preferred clutch embodying the invention, FIG. 2 is a plan view in section of the clutch shown in FIG. 1, and FIG. 3 is a side view in section of the clutch shown in FIG. 1.

Referring to FIGS. 1–3, an input clutch mmeber 10 has secured to it a torsionally stiff-axially flexible spring 12, the axis of which is common with the axis of the input clutch member 10. The input clutch member 10 and spring 12 are adapted to be supported on a shaft 14 having threads 16. The spring 12 has a slot 18 into which a boss 20 on a lock washer 22 is adapted to be inserted. The lock washer 22 has additional bosses 24 which are (before assembly of the clutch) in the same plane as the washer 22; a nut 26 having recesses 28 is adapted to be screwed onto the shaft threads 16. After the aforementioned parts are assembled and made integral, the bosses 24 are bent into the recesses 28 to prevent the nut from turning. This prevents the shaft 14 from rotationally moving relative to the input member 10, but allows it to move axially relative thereto.

An output clutch member 30, which in this form of the invention is a gear, has a ring 32 secured to it by means of screws 34. The ring 32 has $n$ radially extending channels or slots 36 adapted to restrain $n$ balls 38 circumferentially, while permitting such balls to move radially toward the axis of the output member 30. In the present illustration $n=3$. Radially aligned with respective channels 36 are $n$ ball receptacles 40 which are partially enveloped by respective channel recesses 42 cut into a rim 44 of the ring 32. A reset cam 46, having $n$ sections of high and low portions, is adapted to bear against the rim 44 and is rotationally held in place by a lock wire 48. The lock wire 48 is seated in a hooked recess 50 and, when the clutch is engaged, the tip 52 of the lock wire urges against and partially into a keyhole 54 in the reset cam 46. The output clutch member 30 has an arcuate slot 56 with a rounded enlarged end portion 58.

In assembling the input and output portions of the clutch, use is made of a nut 60 which is adapted to be threaded onto the threaded portion 62 of the shaft 14, thereby pressing a cover 64 into an opening 66 of the output member 30. The cover 64 is provided with a bushing 68 which fits into an opening 70 in the spring 12. The input member 10 is provided with a cam surface 72, the low portions 73 of which extend slightly radially farther from the clutch shaft 14 than the outermost portions 74 of the ring channels 36. Seats 76, $n$ in number and less deep than the channels 36, are provided in the input member 10 and serve to prevent free rolling of the balls 38 in the channels 36. A washer 78 serves to prevent the input member 10 from touching the balls 38 when they are in their receptacles 40, and a phasing or indexing hole 80 is provided in the input member 10 and positioned so that it circumferentially aligns with the end 58 of the slot 56 when the channels 36 are aligned with the low portions 73 of the cam surface 72.

A key 82 having a narrow indexing section 84 which gradually rises at 86 to a wider section 88 has a slot 90 cut into it, the wider portion 88 of the key being greater than the thickness of the face 92 of the input member 30 (so that the key 82 can only be withdrawn at the enlarged section 58 of the slot 56).

To appreciate the functioning of the above-described clutch, i.e. how it operates, disengages, and re-engages, reference is best had to FIGS. 2 and 3. When the shaft 14 turns, it carries with it the torsionally stiff spring 12 and the input member 10. As a result, the balls 38 which are circumferentially restrained by the channels 36 push against the channels 36 and cause the ring 32 and the output member 30 to rotate with the input shaft 14. (To be noted is that the cam 72 has a substantial flat portion 94 which serves to permit some predetermined amount of relative motion between the input member 10 and the output member 30.) Should the output member experience a substantial load, the clutch will start to slip. With the output member 30 stationary and the input member 10 rotating, the end 96 of the cam 72 flat portion 94 eventually engages the balls 38; further rotation of the input member 10 then causes the portion 98 of the cam 72 to urge the balls radially toward the axis of the clutch and eventually into the receptacles 40. Once the balls are in the receptacles 40 the face 100 of the washer 78 abuts against the face 102 of the cover 64, the balls 38 then being retained in the receptacles 40 out of contact with the ring 32. At this point the input and output clutch members are free to rotate relative to each other and the clutch is disengaged.

To re-engage the clutch, use is made of the reset key 82, the end 84 of which is inserted into the part 58 of the slot 56 (past the end 52 of the lock wire 48). Then the reset cam 46 and the output member 30 are simultaneously rotated together until the key portion 84 finds the indexing hole 80. When this happens, the cam 72 low portions 73 and channels 36 are circumferentially aligned. After finding the indexing hole 80, the key is permitted to move farther into the clutch interior, thereby causing the key portion 86 to push the lock wire 48 away from its normal position and permitting the reset cam 46 to rotate. The key is then withdrawn slightly to disengage the end 84 from the indexing hole 80, after which the cam 46 is rotated relative to the output member 30 by moving the key so that its recess 90 rides in the output member slot 56. In rotating the reset cam 46 relative to the output member 30 the balls 36 are urged back into the channels 36 in the ring 32. This occurs because the channels 42 in the rim 44 of the ring 32 prevent the balls from moving circumferentially, and because the reset cam high portions 104 bear against the balls 38 when the reset cam is rotated and the balls 38 are in their respective receptacles 40. Since the balls 38 can only move radially they return to be reseated in the seats 76 in the input member 10. With the balls reseated, disengagement between the key 82 and the clutch can only occur by returning the key to the end 58 of the slot 56. Then the key can be withdrawn, the end 52 of the lock wire 48 snapping back to bear against the cam 46 and again prevent it from rotating.

One feature about the above clutch is that no change in mechanical advantage occurs when the clutch is about to disengage. That is, though the balls 38 move toward the shaft 14 during disengagement, which decreases the length of the lever arm through which the shaft 14 is coupled to the output member 30, the spring 12 increases in torsional stiffness as the balls ride out of their recessed seats 76, thereby increasing the effective coupling between the shaft 14 and the output member 30. This causes the disengagement to appear sudden and abrupt, and not gradual with an increased stiffening of the coupling between the input and output members as the clutch reaches the disengage point.

Whereas the cam 72 of the input member 10 causes the balls 38 to move radially inward toward the shaft 14 (with the reset cam moving the balls 38 radially outward from the shaft 14), it is obvious that these functions may be inverted, which of course creates increased stiffening of the coupling between input and output members 14 and 30 respectively. Further, while the apparatus described relates to a clutch connecting rotatable input and output members, the techniques described may also be embodied with clutch apparatus interconnecting translationally moving input and output members.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Clutch apparatus comprising $n$ equisized balls, input cam means having $n$ sections each of which is respectively adapted to engage and move one of said $n$ balls, means connected to said input cam means for rotating it about a first axis, a ring member having an axis common with said input cam means axis and having $n$ radial slots, said slots being adapted to restrain circumferentially the balls while permitting radial motion of them, the axial thickness of said ring member being less than the diameter of said balls, said ring member being provided with $n$ recessed seats so positioned that they are radially aligned with respective ring member slots, means adapted to hold said input cam means slidably and contiguously against said ring member, whereby relative rotational motion between the ring member and input cam means tends to cause the input cam means sections to bear against and move the balls radially with respect to said slots and into said seats, said seats being deep enough to prevent the input cam means and said ring member both from touching the balls simultaneously when said balls are in said seats, reset cam means also having an axis common with said first axis, said reset cam means having $n$ sections so misaligned circumferentially with the ring member slots when the relative rotation between said ring member and said input cam means is such that the balls may enter their respective recessed seats and means for rotating about said common axis said reset cam relative to said ring member to cause its sections to urge respective balls out of their recessed seats and radially along said ring member slots.

2. Clutch apparatus comprising $n$ equisized balls, input cam means having $n$ sections each of which is respectively adapted to engage and move one of said $n$ balls, torsionally stiff but axially flexible spring means connected to said input cam means for rotating it about a first axis, a ring member having an axis common with said input cam means axis and having $n$ radial slots, said slots being adapted to restrain circumferentially the balls while permitting radial motion of them, the axial thickness of said ring member being less than the diameter of said balls, said ring member being provided with $n$ recessed seats so positioned that they are radially aligned with respective ring member slots, means adapted to hold said input cam means slidably and contiguously against said ring member, whereby relative rotational motion between the ring member and input cam means tends to cause the input cam means sections to bear against and move the balls radially with respect to said slots and into said seats, said seats being deep enough to prevent the input cam means and said ring member from both touching the balls simultaneously when said balls are in said seats, reset cam means also having an axis common with said first axis, said reset cam means having $n$ sections so misaligned circumferentially with the ring member slots when the relative rotation between said ring member and said input cam means is such that the balls may enter their respective recessed seats, and means for rotating about said common axis said reset cam relative to said ring member to cause its sections to urge respective balls out of their recessed seats and radially along said ring member slots.

3. Clutch apparatus comprising $n$ equisized balls, input cam means having $n$ sections each of which is respectively adapted to engage and move one of said $n$ balls, means connected to said input cam means for rotating it about a first axis, a ring member having an axis common with said input cam means axis and having $n$ radial slots, said slots being adapted to restrain circumferentially the balls while permitting radial motion of them, the axial thickness of said ring member being less than the diameter of said balls, said ring member being provided with $n$ recessed seats so positioned that they are radially aligned with respective ring member slots proximate said common axis, means adapted to hold said input cam means slidably and contiguously against said ring member, whereby relative rotational motion between the ring member and input cam means tends to cause the input cam means sections to bear against and move the balls radially inward toward and into said seats at said common axis, said seats being deep enough to prevent the input cam means and said ring member both from touching the balls simultaneously when said balls are in said seats, reset cam means also having an axis common with said first axis, said reset cam means having $n$ sections so misaligned circumferentially with the ring member slots when the relative rotation between said ring member and said input cam means is such that the balls may enter their respective recessed seats, and means for rotating about said common axis said reset cam relative to said ring member to cause its sections to urge respective balls out of their recessed seats and radially outward along said ring member slots.

4. Clutch apparatus comprising $n$ equisized balls, input cam means having $n$ sections each of which is respectively adapted to engage and move one of said $n$ balls, means connected to said input cam means for rotating it about a first axis, a ring member having an axis common with said input cam means axis and having $n$ radial slots, said slots being adapted to restrain circumferentially the balls while permitting radial motion of them, the axial thickness of said ring member being less than the diameter of said balls, said ring member being provided with $n$ recessed seats so positioned that they are radially aligned with respective ring member slots proximate the perimeter of said ring member, means adapted to hold said input cam means slidably and contiguously against said ring member, whereby relative rotational motion between the ring member and input cam means tends to cause the input cam means sections to bear against and move the balls radially outward away from said common axis and into said seats, said seats being deep enough to prevent the input cam means and said ring member both from touching the balls simultaneously when said balls are in said seats, reset cam means having $n$ sections so misaligned circumferentially with the ring member slots when the relative rotation between said ring member and said input cam means is such that the balls may enter their respective recessed seats, and means for rotating about said common axis said reset cam relative to said ring member to cause its sections to urge respective balls out of their recessed seats and radially inward along said ring member slots.

5. The apparatus of claim 1 including means for locking said reset cam means in a position that permits said balls to enter their respective recessed seats, and key means for releasing said locking means, whereby said reset cam means becomes rotationally movable relative to said ring member.

References Cited by the Examiner
UNITED STATES PATENTS

| 2,490,172 | 12/1949 | Swahnberg | 192—56 X |
| 2,493,232 | 1/1950 | Dodge | 192—56 X |
| 2,508,061 | 5/1950 | Fish | 192—56 |
| 2,775,327 | 12/1956 | Gearhart | 192—56 |

FOREIGN PATENTS

| 1,101,059 | 3/1961 | Germany. |

DAVID J. WILLIAMOWSKY, *Primary Examiner.*
BROUGHTON G. DURHAM, *Examiner.*